United States Patent
Milic

(10) Patent No.: US 7,034,072 B2
(45) Date of Patent: *Apr. 25, 2006

(54) AQUEOUS COATING COMPOSITION

(75) Inventor: Richard Milic, Hradec Kralove (CZ)

(73) Assignee: E. I. duPont de Nemours and Company, Wilmington, DE (US)

( * ) Notice: Subject to any disclaimer, the term of this patent is extended or adjusted under 35 U.S.C. 154(b) by 111 days.

This patent is subject to a terminal disclaimer.

(21) Appl. No.: 10/625,072

(22) Filed: Jul. 22, 2003

(65) Prior Publication Data

US 2005/0020763 A1 Jan. 27, 2005

(51) Int. Cl.
*C08K 3/10* (2006.01)
*C09D 5/29* (2006.01)

(52) U.S. Cl. ........... 524/501; 524/425; 524/423; 524/437; 524/515; 524/560; 427/385.5

(58) Field of Classification Search ........... 524/501, 524/425, 423, 437, 515, 560; 427/385.5
See application file for complete search history.

(56) References Cited

U.S. PATENT DOCUMENTS

| | | | |
|---|---|---|---|
| 4,591,533 A | 5/1986 | Antonelli et al. | |
| 4,609,690 A | 9/1986 | Gruber et al. | |
| 5,476,895 A * | 12/1995 | Ghahary | 524/437 |
| 5,789,032 A | 8/1998 | Le Cong et al. | |
| 6,423,771 B1 * | 7/2002 | Dworak et al. | 524/501 |
| 6,562,894 B1 | 5/2003 | Blum et al. | |
| 6,649,688 B1 * | 11/2003 | Mayer et al. | 524/558 |
| 2003/0049457 A1 | 3/2003 | Munzmay et al. | |
| 2003/0096120 A1 | 5/2003 | Schafheutle et al. | |

FOREIGN PATENT DOCUMENTS

| | | |
|---|---|---|
| DE | 43 38 265 | 12/1994 |
| EP | 1 362 874 | 11/2003 |
| JP | 55-126583 | 9/1980 |
| JP | 10-128911 | 5/1988 |
| JP | 8-295548 | 11/1996 |
| WO | WO97/40113 | 10/1997 |

OTHER PUBLICATIONS

The International Search Report and Written Opinion of the International Searching Authority, Application No. PCT/US2004/023668, Mailed: Nov. 24, 2004.

* cited by examiner

*Primary Examiner*—David W. Wu
*Assistant Examiner*—Satya Sastri
(74) *Attorney, Agent, or Firm*—Steven C. Benjamin

(57) ABSTRACT

An aqueous coating composition comprising
 (a) 10 to 60 wt % of an aqueous dispersion comprising water and one or more water-dilutable binders selected from the group of polymethacrylic, polyacrylic, polyester, polyurethane, hybride polyacrylic/polyester or polyacrylic/polyurethane, epoxy modified binders, with linear, branched or star structure and any mixtures thereof, the amount of said water constituting at least 15 wt % based on the total weight of said component a),
 (b) 5 to 40 wt % of one or more water-dispersible polyisocyanates or mixtures of water-dispersible and water-emulsifiable polyisocyanates, blocked or unblocked,
 (c) 5 to 70 wt % of filler material,
 (d) 1 to 40 wt % of a ground polymer material,
 (e) 0 to 15 wt % of organic co-solvents,
 (f) 0.01 to 15 wt % of additives, pigments and fillers, and
 (g) 3 to 30 wt % of water and
 the invention is directed to a process for applying the aqueous coating to substrates to form decorative surfaces and to the resulting coated substrates.

13 Claims, No Drawings

AQUEOUS COATING COMPOSITION

FIELD OF THE INVENTION

The invention relates to an aqueous coating composition applied as a one-layer coating or a multi-layer coating on a substrate that provides a surface having a stone, marble or granite-like effect and unique aesthetics, and to a process for coating the composition on a substrate.

BACKGROUND OF THE INVENTION

Coatings for substrates used in industrial and housekeeping fields, e.g., for surfaces in kitchens, baths and stores or for wall panels, furniture and other articles in home and business sectors, can have a solid color or stone, granite, or marble-like or other unique appearance.

Such coatings comprise a filled polymer composition that is cured at ambient temperature or can be force-dried at elevated temperature. The coated articles can be costly to produce and difficult to transport and to install due to their heavy and brittle properties, e.g., they are fragile and easily chipped, broken or abused. The breakage rate at the required thickness makes these articles expensive.

Examples for known coatings and coated substrates are described as follows: JP 10128911, JP 8295548, JP 55126583, which relate to coating layers based on thermoplastic resins, such as, polyester, acrylic resins, and reinforced fiber.

U.S. Pat. No. 5,789,032 relates to a curable composition including polyester resin and filler useful for the production of stone, marble, or granite effect coatings. A vibration action is needed to level the composition and to form an equable coating on the surface.

The present invention satisfies the demand for a decorative and robust coating for interior and exterior surfaces, especially for horizontal and vertical working tops, panels; furniture in homes, offices or industrial buildings; counter and dining tables, counter tops, floors; architectural facing of buildings and various articles (lamps, vases, picture frames, etc.) of all types.

SUMMARY OF THE INVENTION

The present invention is directed to an aqueous coating composition comprising (a) 10 to 60 wt % of an aqueous dispersion comprising water and one or more water-dilutable binders selected from the group of polymethacrylic, polyacrylic, polyester, polyurethane, hybride polyacrylic/polyester or polyacrylic/polyurethane, epoxy modified binders, with linear, branched or star structure and any mixtures thereof, the amount of said water constituting at least 15 wt % based on the total weight of said component a), (b) 5 to 40 wt % of one or more water-dispersible polyisocyanates or mixtures of water-dispersible and water-emulsifiable polyisocyanates, blocked or unblocked, (c) 5 to 70 wt % of filler material, (d) 1 to 40 wt % of a ground polymer material, (e) 0 to 15 wt % of organic co-solvents, (f) 0.01 to 15 wt % of additives, pigments and fillers, and (g) 3 to 30 wt % of water.

The composition is formed as a flowable liquid and is cured after application on the substrate. The cured coating can be sanded and polished. The final article can be cut into a desired shape if necessary.

The appearance of the final coating prepared from the coating composition according to the invention is characterized by a solid and/or a stone-, granite-, marble-like appearance or other special aesthetic appearance. The articles produced with the coating composition according to the invention can be used as decorative surfaces, e.g., countertops, wall panels, for furniture, for floors, and for all types of various articles. The coatings and the coated products are robust and stable and are workable and repairable. The coatings can be applied in a factory or on location. They have an appearance of stone, cultured marble or granite, such as the material Corian®.

The present invention is also directed to a process for coating a substrate comprising applying the coating composition according to the invention on the substrate within a dry thickness layer range from 15 to 25 mils (0.381 to 0.635 mm) by a single application and curing said coating.

The composition can be characterized as a low VOC (Volatile Organic Content) composition.

DETAILED DESCRIPTION OF THE INVENTION

The content of the aqueous dispersion, component a), is from 10 to 60 wt %, preferably from 20 to 50 wt %, based on the coating composition.

The aqueous dispersion, component a), is based on water-dilutable binders.

The binders of component a) are functionalized by hydroxy and/or carboxy and/or amino groups. The OH-value and the COOH-value can be, for example, in the range from 10 to 300. Particularly preferred, are hydroxy and/or carboxy functionalized polymers having an OH-value in the range of 10 to 300 and a carboxy value of 10 to 50. If amino groups are present, hindered secondary amino groups are preferred.

The functionalized polymers can be manufactured by emulsion polymerization reactions known by a skilled person, by a radical polymerization but also, e.g., by a polymerization reaction caused by a photochemical reaction or by electromagnetic radiation or by polycondensation reaction followed emulsification in water. Group Transfer Polymerization can also be used. Emulsion polymerization is preferred.

The polymers can be linear, branched or star structured.

Suitable monomers or co-monomers for the manufacture of the acrylic and methacrylic binders of component a) may be, e.g., acrylates, methacrylates, methyl methacrylates, styrene, acrylonitrile, vinyl acetate, butadiene, including monomers, such as, acrylic acid, methacrylic acid, itaconic acid, maleic acid, crotonic acid and/or amides. To obtain the functionalized polymethacrylics and polyacrylics, suitable monomers can be incorporated into the polymer, e.g., carboxy-functionalized monomers, such as, maleic acid, acrylic acid and methacrylic acid, and, for example, hydroxy-functionalized monomers, such as, hydroxy acrylates, hydroxy methyl acrylates, propylene glycol methacrylates, butanediol monoacrylates and the like.

Suitable monomers or co-monomers for the manufacture of the functionalized polyesters or polyurethanes may be, for example, neopentyl glycol, cyclohexanedimethanol, 1,6 hexanediol, trimethylolpropane, pentaerythritol, phthalic anhydride, isophthalic acid, hexahydrophthalic anhydride, adipic acid, azelaic acid and dimer fatty acids.

The polyesters or polyurethanes can be, for example, linear, branched, star structured, chemically modified by silicones, styrene, acrylics, epoxide, and the range of the OH value can be 10 to 300.

Star resins may be used as binders of component a) and are oligomers with a star structure, which have 3 to 6 arms. Oligomers are prepared by reaction of trimethylolpropane, pentaerythritol or other multifunctional compounds with, e.g., compounds containing glycidyl groups. They include polyester bonds and both primary and secondary hydroxyl groups.

As binders of component a) one or more polyacrylic, polymethacrylic, polyester, polyurethane and/or star polymers are preferred.

The polymers of component a) are contained in the range from about 85 to 20 wt %, preferably from about 70 to 25 wt %, based on component a).

The binders can also be used as aqueous dispersion that is directly produced from the emulsion polymerization of the binder monomers or co-monomers, as component a). This use is preferred.

The aqueous dispersion, component a), contains at least 15 wt % of water. An amount of said water in a range of 30 to 75 wt %, based on the dispersion, is preferred.

Examples of polyisocyanates that may be used as component b) are in the free or blocked form as crosslinking agents and may include triisocyanates, diisocyanates, and cycloaliphatic diisocyanates, such as, 1,6-hexane diisocyanate, trimethylhexane diisocyanates, 1,12-dodecanediisocyanates, cyclohexane diisocyanates, isophorones, diisocyanates with cyclohexylmethane diisocyanates or mixtures thereof, and polyisocyanates derived from such diisocyanates, for example, those containing hetero atoms in the radical linking the isocyanates groups. Examples thereof include polyisocyanates containing carbo diimide groups, isocyanurate groups, urethdiol groups, urethane groups and/or biuret groups.

Polyisocyanates that may be used as component b) are hydrophilically modified, water-dispersible products or mixtures of both hydrophilic and hydrophobic polyisocyanates, that means mixtures of both water-dispersible and water-emulsifiable products.

Suitable blocking agents for the polyisocyanate crosslinking agents described above may include the conventional, for example, CH-acidic, NH-, SH- or OH-functional blocking agents. Examples include acetyl, acetone, acetoacetic acid acyl esters, valonic acid diacyl esters, aliphatic or cycloaliphatic alcohols, oximes, lactams, imidacoles, pyracoles.

Isocyanurates, biurets, uretdions, or allofanates of 1,6-hexane diisocyanate are the preferred compounds of component b).

When using free (unblocked) polyisocyanates as component b), the coating composition according to the invention is prepared by keeping the polyisocyanate component b) separate from component a) and then shortly before application component b) is thoroughly mixed with component a) and the other components of the coating composition.

The polyisocyanates, component b), are contained in the range from about 5 to 40 wt %, preferably from about 5 to 20 wt %, based on the coating composition.

The coating composition according to the invention contains a filler material as component c). The content of this filler material is from 5 to 70 wt %, preferably 10 to 60 wt %, based on the coating composition. Examples of the filler material are aluminum hydroxide, also known as alumina trihydrate, $Al_2O_3.3H_2O$, calcium carbonate ($CaCO_3$), Silica ($SiO_2$), magnesium hydroxide ($Mg(OH)_2$), barium sulfate ($BaSO_4$), clays, talcs, alumina monohydrate ($Al_2O_3.H_2O$) or polymeric fillers. Preferably, aluminum hydroxide, $Al_2O_3.3H_2O$, is used as component c).

The component d) is a small-grained solid material, which is different from component c), and which is a ground polymer material. The content of this component is from 1 to 40 wt %, preferably 2% to 30 wt %, based on the coating composition.

This material can be based on polymethyl methacrylate (pMMA), crosslinked unsaturated polyester, epoxide or other polymeric material—filled or unfilled.

This material can be ground or calendered by mills, grinders or calender to small particles like granules, crunchies, flakes, and powder particles. The material can be toned in different colors or in one color. Examples of additives used in this material are, e.g., colorants, antioxidants, catalysts, light stabilizers, and also fillers. One example for the component d) is a filled polymer material consisting of about 40% of polymethyl methacrylate, of about 60% of aluminum hydroxide, colorants, and other additives at low levels, for example, known under the name of Corian®, which is a product of DuPont.

Examples of organic co-solvents that may be used in the coating composition according to the invention as component e) include glycol ether esters, such as, ethyl glycol acetates, butyl diglycol acetates, methoxypropyl acetates; esters, such as, propylenecarbonate(4-methyl-1,3-dioxolan-2-on), ethyl acetate, butyl acetate, isobutyl acetate, amyl acetate; ketones, such as, methyl ethyl ketone, methyl propyl ketone, methyl isopropyl ketone, methyl isobutyl ketone, diisobutyl ketone, methyl amyl ketone, cyclohexanone, isophorones; aromatic hydrocarbons, such as, toluene, xylenes, Solvesso® 100 (mixture of aromatic hydrocarbons with a boiling range from 155 to 185° C.), Solvesso® 150 (mixture of aromatic hydrocarbons with a boiling range from 182 to 202° C.), and aliphatic hydrocarbons. The organic co-solvents are contained in the range from 0 to 15 wt %, preferably in a range of 0 to 5 wt %, based on the coating composition.

The coating composition may contain conventional coating additives, pigments and fillers in total amount up to 15 wt. % based on coating composition ready for application, as component f).

Additives are, for example, leveling and anticratering agents, defoamers, dispersing and wetting additives, rheological modifiers, such as, pyrogenic silica, modified clays, polyamides and urea group-containing reaction products of amines (sagging control agents), catalysts, colorants, light stabilizers, UV absorbers, antioxidants and the like.

Depending on the intended use of the coating composition and on the integrated components, the coating composition may be unpigmented (transparent), translucent, or contain pigments. They may therefore contain fillers, which are different from the component c) and/or transparent, color imparting and/or special effect-imparting pigments. Examples of inorganic or organic color-imparting pigments include titanium dioxides, micronized titanium dioxide, iron oxide pigments, carbon black, azo pigments, phthalocyanine pigments, quinacridone or pyrrolopyrrole pigments. Examples of special effect-imparting pigments include metallic pigments, interference pigments, e.g., metal oxide coated metallic pigments, e.g., titanium dioxide-coated or mixed oxide-coated aluminum, coated mica, e.g. titanium dioxide-coated mica and graphite effect like special-effect pigments. Examples of suitable fillers include aluminum trihydrate, silica, aluminum silicates, barium sulfates, calcium carbonates, and talc.

Optionally, any material may be added for a decorative effect. Decorative additives, such as, crushed stones, gemstones, metal flake or fillings, micas, seashells, pearls, colored or transparent polymeric particles or fibers, mirrored particles and pigments may be added in quantities according to taste or fashion. However, these quantities usually do not exceed 5 wt %, preferably 2 wt %. The decorative additives may be thoroughly mixed with the other components or placed on the surface.

The water, component e), is preferably deionized water (d.i.water). The content is from 3 to 30 wt %, preferably from to 5 to 20 wt %, based on the coating composition.

The coating composition according to the invention may have a uniform color, a stone-like and/or a special aesthetic appearance.

The coating composition according to the invention in the state ready for application has a solids content, formed from the polymer solids and the optionally contained non-volatile additives and optionally contained pigments, from 40 to 75 wt %. The coating composition contains water and may contain organic co-solvents as mentioned above, as volatile constituents.

The coating composition can take the form of a one-component coating composition or a two-component composition. In case of a two-component coating composition, one component contains the aqueous dispersion, component a), and the other component contains the water-dilutable polyisocyanates, component b). The other components of the coating composition according to the invention, that means the filler material, the ground material, organic co-solvents, additives, pigments, fillers and water may be presented in either one or in both of the two components. Preferably they may be present in the component, which contains the dispersion, component a).

The coating composition according to the invention may be used in the preparation of a one-layer coating on any substrates of, for example, metal, plastic, or substrates composed of a mixed construction of metal and plastic and of any other material, for example, clay, tile, woven glass fiber, masonites and the like. Substrates employed include also plywood, particle board, medium-density fiber board (MDF board), tile board. These substrates can be used as products such as existing and in place counter tops, cabinets, wall panels, furniture, slabs board, ceramic tile, high pressure laminate (HPL), low pressure laminate and other such laminates, stainless steel, gypsum board, glass and the like. The coating composition may also be applied directly over ceramic tile/group installations in such a way that a seamless surface is formed with tile-like appearance.

The coating composition according to the invention can be applied directly on the untreated surface of a substrate, for example, of a porous substrate. It is also possible to use the coating composition according to the invention for a multi-layer coating of the substrate whereby the multi-layer coating may consist of several coating layers of the coating composition of the invention. Smooth or glass like surface should be coated, for example, by a 2-pack epoxy primer or other appropriate primer to ensure proper adhesion of the coating composition according to the invention. Preferably, the coating composition is used as a direct coating of the untreated surface of a porous substrate.

In the event the coating composition is used for outdoor purposes, for example, on the exterior of a building, the weatherability of the composition can be improved by the addition of an ultraviolet light stabilizer or a combination of ultraviolet light stabilizers in the amount of 0.1 to 5 wt %, based on the weight of the composition. Such stabilizers include ultraviolet light absorbers, screeners, quenchers, and specified hindered amine light stabilizers. Also, an antioxidant can be added, in the amount 0.1 to 2 wt %, based on the weight of the composition.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533. Typically useful hindered amine light stabilizers that can be used are, for example, Tinuvin® 1130 and Tinuvin®292 or mixtures thereof, commercially available from Ciba Specialty Chemicals, Tarrytown, N.Y.

The coating composition according to the invention can be applied by known methods, e.g., via commercial spray gun equipment, preferably, by spray gun with pressured upper container. Particularly, it can be sprayed in a dry layer thickness of 10 to 25 mils (0.250 to 0.635 mm), preferred 15 to 25 mils (0.381 to 0.635 mm) regarding a one-layer application. The final coating thickness of a multi-layer coating can be designed to be, for example, 40 to 80 mils (1.016 to 2.032 mm) or thicker, preferred 50 to 60 mils (1.270 to 1.524 mm), and can be built in 15 to 25 mils (0.381 to 0.635 mm) increments per single spray application depending on the intended use.

The applied coating composition according to the invention can be cured by crosslinking at ambient temperature as well as at elevated temperature. It is desirable, but not necessarily, to have a short flash-off phase before start of the curing step at elevated temperature. The curing temperature can vary from 15 to 100° C., particularly from 25 to 80° C. The curing times are, for example, of the order of magnitude of 20 min. to 24 hours. Preferably, the coating composition according to the invention is crosslinked at ambient temperature in the range of 15 to 35° C., preferably of 20 to 30° C. in the time range to 24 hours. If forced drying is applied for curing, temperature range 60 to 100° C. is recommended, preferably of 60 to 80° C., in a time range of 20 to 60 minutes. A hard, crosslinked surface is obtained with a glossy lacquer-like appearance having good resistance to chemicals, outstanding mar resistance and very good optical properties.

The cured coating can be sanded and/or polished to achieve a smooth surface of a desired thickness. The coated substrate or article can be cut into desired shapes.

The cured surface has a high quality that means scratch-resistance, stain-resistance, heat-resistance, chip-resistance and superior hardness.

It is possible to replace solid and/or cast materials, such as, marble or granite slabs, walls, panels and the like by substrates coated with the coating composition according to the invention with a high stability and strength as well as a high weather-proof property with a good heat and stain resistance.

The coating composition can also be used for store fixtures, vertical surfacing on substrates of all types and also horizontal surfacing. It could replace wallpaper. Formulations can be used outdoors as architectural facings, for example, with a proper UV stabilization.

The following examples illustrate the invention. All parts and percentages are on a weight basis unless otherwise noted. Molecular weights are determined by gel permeation chromatography using polymethylmethacrylate as the standard.

EXAMPLES

Example 1

Preparation of Coating Compositions of the Invention

Composition 1:

|  | Wt. % |
|---|---|
| Part A | |
| 1 Setalux ® 6501 AQ-42 (Acrylic polyol with 4.2% of OH groups, 42 wt. % emulsion in water, manufactured by AkzoNobel) | 38.25 |
| 2 D.I. Water (deionized water) | 9.67 |
| 3 Additol ® XW 330 (30 wt. % aqueous solution of an ammonium salt of a low molecular weight polyacrylic acid, manufactured by Solutia) | 0.38 |
| 4 Preventol ® D7 (Aqueous, formaldehyde-free formulation of various isothiazolinones, manufactured by Bayer) | 0.30 |
| 5 BYK ® 028 (mixture of hydrophobic solids and foam destroying polysiloxanes, manufactured by BYK-Chemie GmbH) | 0.96 |
| 6 Tego ® Airex 901 W (deareator for water-based coating systems, manufactured by Degussa) | 0.48 |
| 7 Bentone ® EW (purified Hecorite clay used to thicken water based systems, manufactured by Elementis) | 0.19 |
| 8 Aerosil ® R972 (Fumed silica hydrophobically modified rheological additive having a BET value of 110 $m^2/g$, manufactured by Degussa) | 1.92 |
| 9 Surfynol ® 104 DPM (Mixture of acetylenic diols, manufactured by Air Products) | 1.34 |
| 10 Solvesso ® 100 (mixture of aromatic hydrocarbons with a boiling range from 155 to 185° C., manufactured by Shell) | 1.82 |
| 11 Aluminum trihydrate, filler | 24.55 |
| 12 Hindered Amine Light Stabilizer [Bis(1,2,2,6,6-pentamethyl-4-piperidyl) sebacate and methyl(1,2,2,6,6-pentamethyl-4-piperidyl) sebacate] | 0.96 |
| 13 UV absorber (Methyl-3-[3-(2H-benzotriazol-2-yl)-5-tert.butyl-4-hydroxyphenyl]propionate) | 0.48 |
| 14 Corian ® Crunchies (Ground polymer material of polymethymethacrylate filled with alumina trihydrate and various fillers) | 16.30 |
| 15 BYK ® 346 (Solution of a polyether modified poly-dimethyl-siloxane, 45 wt % in Dowanol DPM, manufactured by BYK-Chemie GmbH) | 0.96 |
| 16 DSX ® 3290 (Associative rheology modifier, 50 wt. % in mixture butyl glycol/water 1:3, manufactured by Cognis) | 1.44 |
| Part B | |
| Activator (Water-dispersible aliphatic polyisocyanate, 18% NCO, manufactured by Bayer) | 15.0 |

Components 1 to 13 are premixed by high-speed disperser and then round in bead mill to fineness of grinding 6 of Hegman scale. The resulting composition is immediately mixed stepwise with components 14 to 15 and then the rheology modifier (16) is carefully added. The final mixture is homogenized for about 20 minutes.

Before application, Part A is mixed with Part B in weight ratio 100:15.0. The composition is ready to use. If necessary it can be thinned with water.

Composition 2:

|  | Wt. % |
|---|---|
| Part A | |
| 1 Acrylic core-shell emulsion with composition MMA/EHA/HEMA/HPMA/TBAEMA/MAA, OH 4.1%, Solids 54.1%, Visco 440 cps, pH 8.6, Mn/Mw = 3200/6100 | 29.41 |
| 2 D.I. Water | 18.47 |
| 3 Pigment Disperser - A (30 wt. % aqueous solution of an ammonium salt of a medium molecular weight polyacrylic acid, manufactured by BASF) | 0.34 |
| 4 Preventol ® D7 (Aqueous, formaldehyde-free formulation of various isothiazolinones, manufactured by Bayer) | 0.30 |

-continued

|   |   | Wt. % |
|---|---|---|
| 5 | Tego ® Foamex 810 (foamer for water-based coating systems, 50 wt. % in Dovanol DPM, manufactured by Degussa) | 0.49 |
| 6 | Tego ® Airex 901 W (deareator for water-based coating systems, manufactured by Degussa) | 0.49 |
| 7 | Bentone ® EW (purified Hecorite clay used to thicken water based systems, manufactured by Elementis) | 0.20 |
| 8 | Aerosil ® R972 (Fumed silica hydrophobically modified rheological additive having a BET value of 110 $m^2/g$, manufactured by Degussa) | 2.00 |
| 9 | Surfynol ® 104 DPM (Mixture of acetylenic diols, manufactured by Air Products) | 1.39 |
| 10 | Kodaflex ® TXiB (plasticizer, manufactured by Eastman) | 0.89 |
| 11 | Aluminum trihydrate, filler | 26.20 |
| 12 | Corian ® Crunchies (Ground polymer material of polymethymethacrylate filled with alumina trihydrate and various fillers) | 17.60 |
| 13 | BYK ® 346 (Solution of a polyether modified poly-dimethyl-siloxane, 45 wt % in Dowanol DPM, manufactured by BYK-Chemie GmbH) | 1.02 |
| 14 | DSX ® 3290 (Associative rheology modifier, 50 wt. % in mixture butyl glycol/water 1:3, manufactured by Cognis) | 1.20 |
|   | Part B |   |
|   | Bayhydur 3100 (Water-dispersible aliphatic polyisocyanate, 17.4% NCO, manufactured by Bayer) | 1.83 |
|   | Desmodur ® 3600 (Aliphatic polyisocyanate, 23.0% NCO, manufactured by Bayer) | 4.26 |
|   | Dowanol ® PMA | 1.51 |

Components 1 to 11 are premixed by high-speed disperser and then ground in bead mill to fineness of grinding 6 of Hegman scale. The resulting composition is immediately mixed stepwise with components 12 to 13 and then the rheology modifier (14) is carefully added. The final mixture is homogenized for about 20 minutes.

Before application, Part A is mixed with Part B in weight ratio 100:7.6. The composition is ready to use. If necessary it can be thinned with water.

Composition 3:

|   |   | Wt. % |
|---|---|---|
|   | Part A |   |
| 1 | Luhydran ® LR 8837 (Acrylic polyol with 2.0% of OH groups, 40 wt. % emulsion in water, manufactured by BASF) | 48.67 |
| 2 | D.I. Water | 9.36 |
| 3 | Pigment Disperser - A (30 wt. % aqueous solution of an ammonium salt of a medium molecular weight polyacrylic acid, manufactured by BASF) | 0.41 |
| 4 | Preventol ® D7 (Aqueous, formaldehyde-free formulation of various isothiazolinones, manufactured by Bayer) | 0.36 |
| 5 | BYK ® 011 (mixture of hydrophobic solids and foam destroying polysiloxanes, manufactured by BYK-Chemie GmbH) | 1.16 |
| 6 | Tego ® Airex 901 W (deareator for water-based coating systems, manufactured by Degussa) | 0.59 |
| 7 | Bentone ® EW (purified Hecorite clay used to thicken water based systems, manufactured by Elementis) | 0.24 |
| 8 | Aerosil ® R972 (Fumed silica hydrophobically modified rheological additive having a BET value of 110 $m^2/g$, manufactured by Degussa) | 2.42 |
| 9 | Surfynol ® 104 DPM (Mixture of acetylenic diols, manufactured by Air Products) | 1.85 |
| 10 | Aluminum trihydrate, filler | 31.72 |
| 11 | BYK ® 346 (Solution of a polyether modified poly-dimethyl-siloxane, 45 wt % in Dowanol ® DPM, manufactured by BYK-Chemie GmbH) | 1.23 |
| 12 | DSX ® 3290 (Associative rheology modifier, 50 wt. % in mixture butyl glycol/water 1:3, manufactured by Cognis) | 1.97 |
|   | Part B |   |
|   | Basonat HW 180 PC (Water-emulsifiable polyfunctional isocyanurate, 80 wt. % in propylencarbonate, 14% NCO manufactured by BASF | 21.47 |

| | Wt. % |
|---|---|
| Propylencarbonate | 2.73 |
| Corian ® Crunchies (Ground polymer material of polymethymethacrylate filled with alumina trihydrate and various fillers) | 21.80 |

All components of Part A are premixed by high-speed disperser and then ground in bead mill to fineness of grinding 6 of Hegman scale.

Part B preparation: Corian® Crunchies are added in small amounts to the solution of Activator in propylencarbonate and the mixture is homogenized by high-speed dissolver.

Before application, Part A is mixed with Part B in weight ratio 100:46. The composition is ready to use. If necessary it can be thinned with water.

Example 2

Application on Plywood Substrate:

A mixture of both part A and B of Composition 2 from Example 1 is applied by spray gun with pressured upper container and jet nozzle diameter 2.3 mm on a plywood substrate. The pressure on spray gun jet nozzle is about 0.2 MPa and the overpressure in upper container is about 7 kPa. Wet thickness of the first layer should be maximally 10 mils (0.250 mm) to ensure good adhesion and low content of entrapped solvents close to the surface. After 1 hour of drying at ambient temperature, the film is force-dried in oven for one hour at 60° C. The second and the next layers are sprayed on the force-dried film after the substrate is cooled to room temperature and the thickness is about 15 mils (0.381 mm). The resulting film is force dried at 60° C. for 1 hour or can be dried at room temperature for at least 24 hours before the next layer is applied. When the required thickness is reached, about 60 mils (1.524 mm), the films are post-cured at 60 to 80° C. for several hours to accelerate the hardness development and to improve sandability.

Example 3

Application on Glazed Ceramic Tiles:

Commercially available two-pack epoxy primer was mixed with hardener and thinned to an application viscosity (flow time 18 to 20 seconds at Ford Cup with jet diameter 4 mm). A layer of film is applied by spraying on the tile substrate with a spray gun having a jet nozzle diameter of 18 mm and a jet nozzle pressure 0.17 to 0.2 MPa.

The primer was applied on smooth glazed ceramic tiles in wet thickness about 0.100 mm. This film was allowed to dry at ambient temperature for 24 hours.

The mixture of both part A and B of Composition 1 from Example 1 was applied by spray gun with pressured upper container and jet nozzle diameter 2.3 mm. The pressure on spray gun jet nozzle is about 0.2 MPa and the overpressure in upper container is about 7 kPa. Each applied layer has a dry film thickness about 15 mils (0.381 mm).

The first layer is dried for 1 hour at ambient temperature and then the film is force-dried in oven for one hour at 60° C. The second and the next layers are sprayed on the force-dried film after the substrate is cooled to room temperature. Forced drying at 60° C. for 1 hour or room temperature drying for at least 24 hours is necessary before the next layer is applied. When the required thickness is reached, about 60 (1.524), the coated films are cured at ambient temperature for several days to achieve appropriate film hardness for good sandability.

Example 4

Application on Particle Board Substrate:

A mixture of both part A and B of Composition 3 from Example 1 is applied by spray gun with pressured upper container and jet nozzle diameter 2.3 mm on a substrate. The pressure on spray gun jet nozzle is about 0.2 MPa; the overpressure in upper container is about 7 kPa.

Wet thickness of the first layer should be maximally 10 mils (0.250 mm) to ensure good adhesion and low content of entrapped solvents close to the surface. After 1 hour of drying at ambient temperature, the film is force-dried in oven for one hour at 60° C. The second and the next layers are sprayed on the force-dried film after the substrate is cooled to room temperature and can be thicker—about 15 mils (0.381 mm). The film layers are forced dried at 60° C. for 1 hour or can be dried at room temperature drying for at least 24 hours before the next layer is applied. When the required thickness is reached about 60 mils (1.524 mm), the coated films are post-cured at 60 to 80° C. for several hours to accelerate the hardness development.

What is claimed is:

1. An aqueous coating composition comprising,
   (a) 10 to 60 wt % of an aqueous dispersion comprising water and at least one water-dilutable binders selected from the group consisting of polymethacrylic, polyacrylic, polyester, polyurethane, with linear, branched or star structures, hybrid polyacrylic/polyester or polyacrylic/polyurethane, epoxy modified binders, and mixtures thereof, the amount of said water constituting at least 15 wt % based on the total weight of said component,
   (b) 5 to 40 wt % of at least one water-dispersible polyisocyanates or mixtures of water-dispersible and water-emulsifiable polyisocyanates, blocked or unblocked,
   (c) 5 to 70 wt % of filler material,
   (d) 2 to 30 wt % of a ground polymer material, comprising polymethyl methacrylate containing filler, which is different from component (c),
   (e) 0 to 15 wt % of organic co-solvents,
   (f) 0.01 to 15 wt % of additives, pigments and,
   (g) 3 to 30 wt % of water, wherein said water includes the water in component (a).

2. The composition according to claim 1 wherein one or more binders selected from the group consisting of polyacrylics, polymethacrylics, polyesters, polyurethanes and polymers with star structure are used as component (a).

3. The composition according to claim 1 wherein component (b) is selected from the group consisting of isocyanurates, biurets, uretdions and allophanates of 1,6-hexane diisocyanate.

4. The composition according to claim 1 wherein component (c) comprises 10 to 60 wt. % of the coating composition.

5. The composition according to claim 4 wherein component c) is aluminum hydroxide.

6. The composition according to claim 1 wherein component d) consists of about 40 wt. % polymethyl methacrylate, and 60 wt. % of aluminum hydroxide, colorants, and other additives.

7. The composition according to claim 1 wherein the amount of the water, component (g), is from 5 to 20 wt. %.

8. The composition according to claim 1 wherein the amount of the organic co-solvents, component (e), is from 0 to 5 wt. %.

9. The composition according to claim 1, wherein component a) is directly manufactured from the emulsion polymerization of the binder monomers or co-monomers.

10. A process for coating a substrate which comprises applying a one-coat layer on a substrate within a dry thickness layer range from 15 to 25 mils (0.381 to 0.635 mm) using a coating composition according to claim 1 and curing said coating.

11. A process for forming a multi-layer coating which comprises applying several coating layers to a substrate within a dry thickness layer range from 15 to 25 mils (0.381 to 0.635 mm) for each layer using a coating composition according to claim 1 and curing said coating layers.

12. A process for forming a coating layer as one-coating layer of a multi-layer coating which comprises applying to a substrate a coating layer selected from the group consisting of externally pigmented top coat layer and transparent clear coat layer said coating layer being applied from the coating composition according to claim 1 within a dry thickness layer range from 15 to 25 mils (0.381 to 0.635 mm) and curing said coating layer.

13. A substrate coated with the coating composition according to claim 1 and then cured.

* * * * *